United States Patent
Salomonsson

(10) Patent No.: US 6,588,295 B1
(45) Date of Patent: Jul. 8, 2003

(54) DEVICE AND METHOD FOR DISTRIBUTING A CABLE ASSEMBLAGE IN AN INDUSTRIAL ROBOT

(75) Inventor: Dan Salomonsson, Vasteras (SE)

(73) Assignee: ABB AB, Vasteras (SE)

( * ) Notice: Subject to any disclaimer, the term of this patent is extended or adjusted under 35 U.S.C. 154(b) by 0 days.

(21) Appl. No.: 09/807,538

(22) PCT Filed: Oct. 15, 1999

(86) PCT No.: PCT/SE99/01864
§ 371 (c)(1),
(2), (4) Date: May 17, 2001

(87) PCT Pub. No.: WO00/25991
PCT Pub. Date: May 11, 2000

(30) Foreign Application Priority Data

Oct. 16, 1998  (SE) ................................................ 9803548

(51) Int. Cl.⁷ ............................... B25J 17/00; F16C 3/08
(52) U.S. Cl. ................ 74/490.02; 242/615.3; 414/918; 901/28; 248/65
(58) Field of Search ....................... 414/918; 242/615.3; 74/490.02; 901/23, 27, 28, 29, 50; 248/65, 73

(56) References Cited

U.S. PATENT DOCUMENTS

| | | | |
|---|---|---|---|
| 4,499,784 A | * | 2/1985 | Shum .......................... 901/29 |
| 4,703,668 A | * | 11/1987 | Peter ........................... 901/29 |
| 4,712,972 A | | 12/1987 | Nakashimsa et al. |
| 4,812,132 A | | 3/1989 | Gunnarsson |
| 4,864,888 A | * | 9/1989 | Iwata ........................... 901/23 |
| 4,904,148 A | * | 2/1990 | Larsson ........................ 901/23 |
| 4,906,121 A | * | 3/1990 | Torii et al. .................... 901/28 |
| 4,955,250 A | | 9/1990 | Fisher |
| 4,990,022 A | * | 2/1991 | Watanabe et al. ............. 901/28 |
| 5,816,107 A | * | 10/1998 | Takahashi et al. .......... 414/918 |
| 5,816,108 A | * | 10/1998 | Obata et al. ................... 901/29 |
| 5,848,556 A | * | 12/1998 | Ryu et al. ................ 74/490.02 |
| 6,014,909 A | * | 1/2000 | Fiora ....................... 74/490.02 |

FOREIGN PATENT DOCUMENTS

| | | |
|---|---|---|
| FR | 2599568 | * 12/1987 |
| GB | 1092945 | 11/1967 |
| JP | 2-303791 | * 12/1990 |

OTHER PUBLICATIONS

Japanese Patent Abstract, publication No. 09309091, dated Feb. 12, 1997, Wiring Structure For Robot for Industrial Use.

* cited by examiner

Primary Examiner—Michael R. Mansen
(74) Attorney, Agent, or Firm—Dykema Gossett PLLC

(57) ABSTRACT

Device for guiding a cable set arranged at a manipulator equipped with a control device where the cable set forms an external loop/a slack in the transition between a first and a second manipulator part joined by a link including a guiding device that freely surrounds the cable set characterized in that the guiding device can be opened and includes a suspension device so that it can be suspended to rotate freely in the link section between the two manipulator parts.

6 Claims, 3 Drawing Sheets

DEVICE AND METHOD FOR DISTRIBUTING A CABLE ASSEMBLAGE IN AN INDUSTRIAL ROBOT

TECHNICAL FIELD

The present invention relates to a device for guiding a cable set arranged at a manipulator equipped with a control device where the cable set forms a slack in the transition between a first and second manipulator part joined by a link-including a guiding device that freely surrounds the cable set.

PRIOR ART

It is known that industrial robots have both power and signal cables drawn internally in the robot. This results, among other things, in a cable set being protected from damage that can occur during operation. In industrial robots where the cable set runs free and is unprotected in the transition between the foot of the robot and the under arm or, alternatively, between two robot arm parts, there is a risk that it may get jammed in other parts of the robot. This problem is particularly acute when a freely hanging part of the cable, arranged to allow movements of the robot, forms an external loop known as a slack. This can entail that the cable set can come into contact with other moving parts of the robot. In the Japanese document JP,A, 09309091, the problem has been solved in the following way. In an industrial robot including a foot, under arm and upper arm that are joined to pivot, the motors that drive the pivoting movement of the under arm respective upper arm are arranged on the foot to be coaxial with the pivoting axis of the under arm (FIG. 5). The design provides an empty space between the driving of the lower and upper robot arms respectively. A coupling axle with a hole running through it at right angles to its longitudinal axis is arranged in the said space in the link. The coupling axle is jointed to rotate at one of its ends and to be firmly attached or, alternatively, to rotate at the other end. The aim of the coupling axle provided with the hole is to counteract the occurrence of slack between two sides in an under arm without reducing the positioning accuracy. The radius of the bending of the cable set within the robot can be made larger and the risk for breaks in the cable is reduced. In addition, the restriction on the degree of rotation of the underarm caused by the cable set inside the robot is eliminated.

Problems arise when one needs to add to the cable set of the industrial robot. Normally, cable sets for robots are manufactured complete with ready-mounted connecting means in the form of, for example, contact plates or contact means. When a ready-made line is to be fitted in an existing robot, there is too little space for the line to be drawn in through the coupling axle. When additions are to be made to an industrial robot according to the Japanese document, one of the connecting means must be removed at the end of the line or, alternatively, the lines are delivered with the coupling axle already attached. In the latter case, a considerable job of assembly must be performed before the new line and coupling axle are in place.

When working with industrial robots, therefore, the need thus arises for a guiding device for the cable set where the device guides a slack and also makes it easy to add extra lines to the cable set. This need cannot be met by the industrial robot in the Japanese document.

SUMMARY OF THE INVENTION

During manufacture, industrial robots are equipped with manipulators-cable sets for driving the robot. They are also provided with so-called customer signals that include the drive cables that the operator/customer needs for their application. The aim of the development of power supplies to robots is to create a flexible system for both the robot manufacturer and the customer. In a flexible system, the robot manufacturer can produce a standard concept. The customer then decides how the robot is to be equipped prior to delivery. Afterwards, a flexible system gives the users/customers themselves the opportunity to decide and equip the robot with the equipment for the functions they require. A flexible system also gives the user the possibility to completely change the functional equipment of the robot so that the robot can be used for totally different tasks during its working life.

The object of the present invention is thus to achieve a device with which one can guide slack and at the same time allow additions to be made to the cable set in a simple manner.

DESCRIPTION OF THE DRAWINGS

The invention is explained in more detail by describing an example of an embodiment with reference to the enclosed drawings, where.

DESCRIPTION OF EMBODIMENTS

Figure 1:
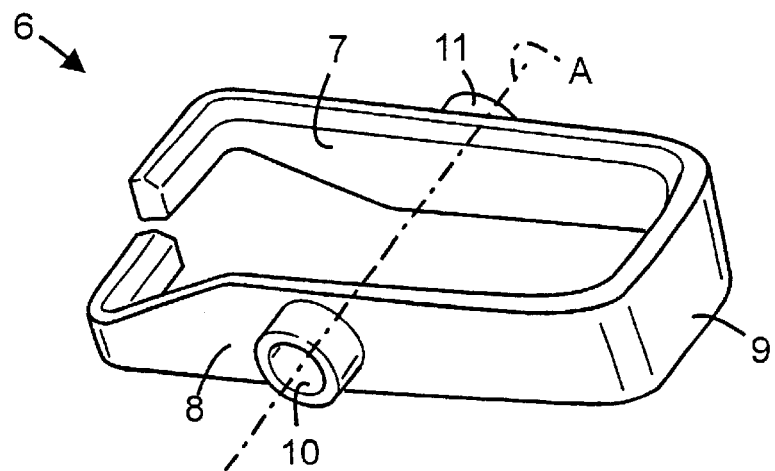
FIG. 1 shows a guiding device according to the invention.
Figure 2:
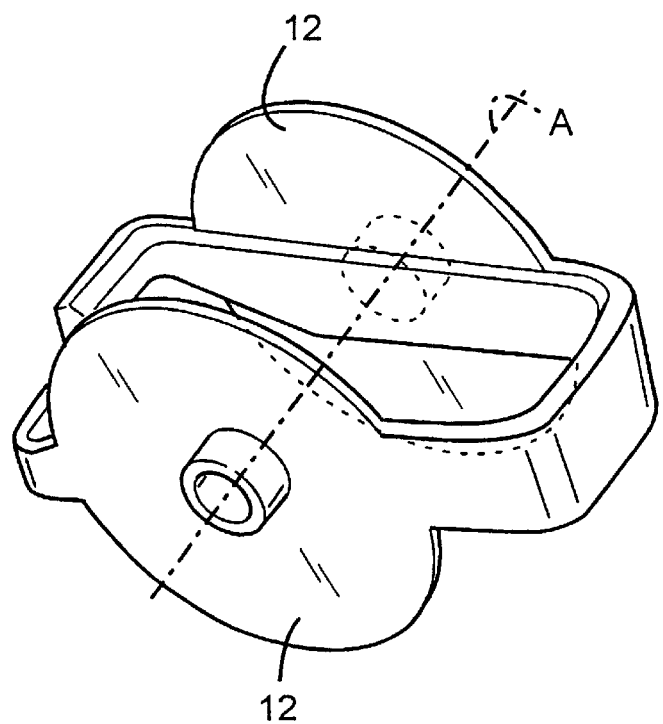
FIG. 2 shows a guiding device equipped with two plate elements.
Figure 3:
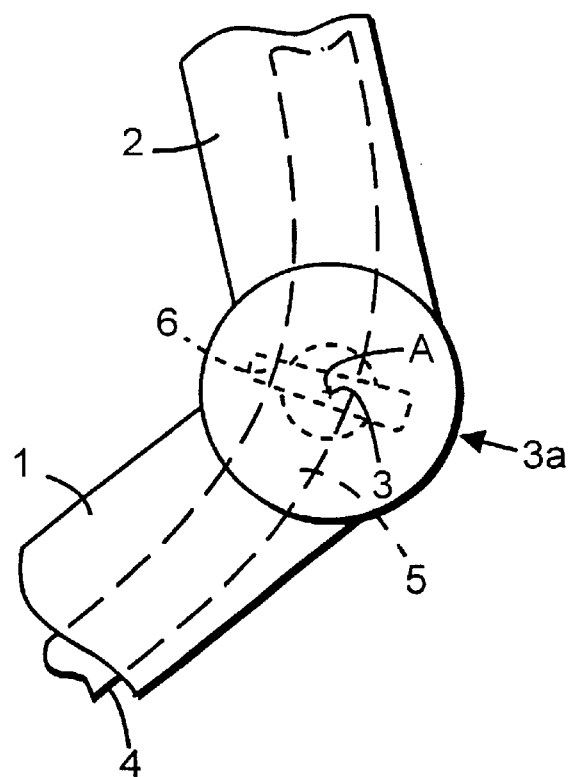
FIG. 3 shows a first and a second manipulator part jointed to pivot as a section in a manipulator equipped with a guiding device.

A first manipulator part (1) is jointed to pivot with a second manipulator part (2) in an otherwise not shown manipulator that is provided with a control device (FIG. 3). The first (1) and the second (2) manipulator part are jointed to pivot and can rotate around a common axis of rotation (3). A cable set (4) runs through both manipulator parts. During operation, the movement of the manipulator creates a need to alter the length of the cable set, which is taken care of by a slack (5) in the transition between the manipulator parts. A guiding device (6) is arranged to guide the cable set so that the movement of the slack sideways is restricted. The guiding device (6) includes (FIG. 1) two sprung shanks (7,8) whose end sections are angled in a direction towards one another but displaced in separate planes as a split in relation to one another. The other ends of the shanks are joined together by a yoke section (9). In this way, the guiding device freely surrounds the cable set, i.e. it surrounds the cable set and is some distance from it. The guiding device can be opened easily by pulling the sprung shanks apart using the force of the fingers. The guiding device is simple to fit by pressing the sprung shanks towards each other using finger pressure, whereby the angled end pieces cross over one another and the guiding device is compressed, whereby it is possible to introduce the guiding device into the desired place in the link. When the pressure of the fingers ceases, the shanks decompress and the guiding device sits in a snapped in fashion in an empty space in the link section. The guiding device is designed with suspension devices (10,11) on at least two of the shanks so that it can turn freely in the link section between the two opposite sides. The suspension devices are designed as sockets/pins arranged on at least one of the shanks. In the embodiment shown (FIG. 3), the guiding device is arranged to sit so that one suspension axis (A) running through the sockets/pins coincides with the axis of rotation (3) of the manipulator link. It is, however, fully possible to arrange the guiding device so that it snaps into the link section without the suspension axis (A) of the guiding device. coinciding with the said axis of rotation (3). The primary aim of the suspension device is that the guiding device can be snapped into place, that the cable set passes through between its yokes, and that the suspension allows the free rotation of the guiding device around its axis of suspension (A). Even when the guiding device is snapped in place, it is still possible to use finger power to pull apart the sprung angled end sections of the shanks to add to the cable set through the guiding device and the manipulator.

Figure 4:
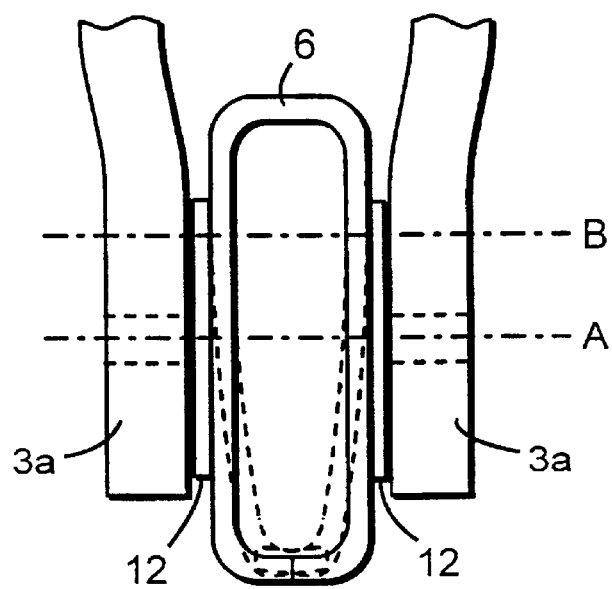
FIG. 4 shows a guiding device equipped with two circular plate elements arranged in a jointed section.
Figure 5:
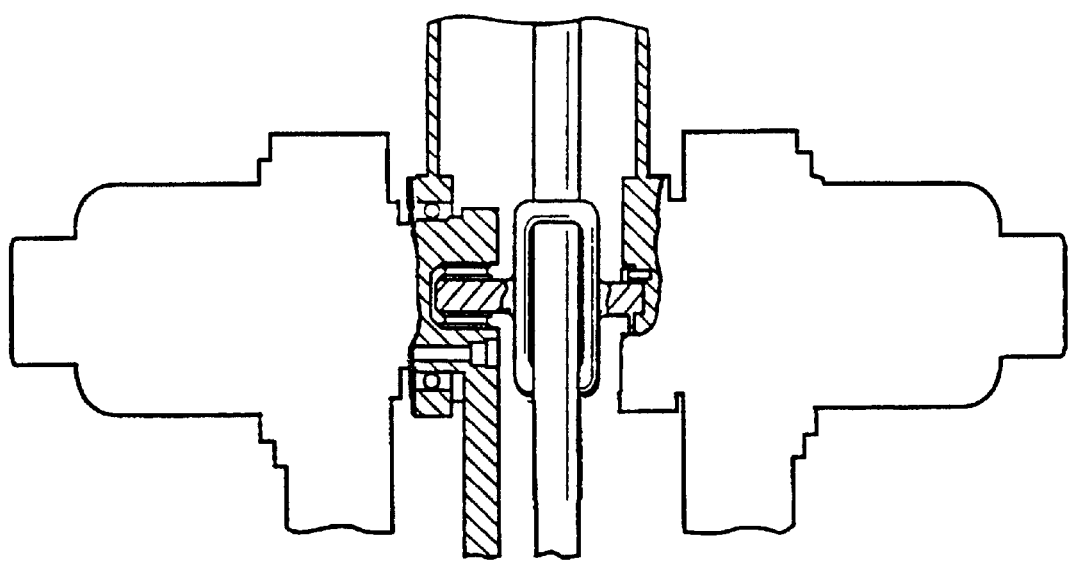
FIG. 5 shows known technology from the Japanese document.

In one embodiment of the invention. the guiding device is designed so that at least one shank is provided with additional support in the form of a plate (12). In the guiding device according to FIG. 4, the guiding device has two shanks, both of which have been provided with plates (12). The plates spread out in a plane at right angles to the axis of suspension (A) of the guiding device. Here, the guiding device is arranged so that the axis of suspension (A) of the guiding device is located at a distance from an axis of rotation (B) of the manipulator link. The aim of the plates is to further guide a slack sideways. In a special embodiment where the guiding device is snapped coaxially with the axis of rotation (B) into a manipulator link, the guiding device can be designed with at least one plate with a circular circumference where the middle point of the circle lies on the common axis of suspension (A)/axis of rotation (B). This symmetry allows the plate (12) to also have a tightening function when abutting the inside of the link that connects the parts of the manipulator.

In a further embodiment of the invention, the guiding device includes more than two shanks. This creates more than one guiding space for the cable set. It allows for more than one line in the cable set to be guided side-by-side and at a distance from one another. The guiding device can also be designed with several shanks where only one is sprung. The guiding device can even be provided with a suspension device only on one shank. Within the concept of the invention, there is also the possibility to use more than one guiding device in the same link for guiding the cable set.

The guiding device is formed in one piece during manufacture. This applies even when the guiding device is complemented by one or more guide plates (12). The guiding device is preferably made of plastic material.

What is claimed is:

1. Device for guiding a cable set arranged at a manipulator equipped with a control device where the cable set forms a slack in the transition between a first and a second manipulator part joined by a link section including a guiding device that freely surrounds the cable set, wherein the guiding device includes a pair of openable spring shanks capable of being pressed toward one another so as to be introduced into a desired position in the link section following which the shanks spring back from one another to snap into place, and the guiding device including a suspension arrangement so that it can be suspended to rotate freely in the link section between the two manipulator parts.

2. Device according to claim 1, wherein the suspension arrangement includes a suspension device arranged on at least one of the shanks.

3. Device according to claim 1, wherein at least one of the shanks of the guiding device is provided with a guiding plate.

4. Device according to claim 1, wherein the guiding device is of a single piece construction.

5. Device according to claim 1, wherein the guiding device is made of plastic material.

6. Method for guiding a cable set arranged at a manipulator equipped with a control device where the cable set forms a slack in the transition between a first and a second manipulator part joined by a link including a guiding device that freely surrounds the cable set comprising the steps of, providing for the opening of the guiding device, providing the guiding device with a suspension device so that the guiding device can be suspended to rotate freely in the link section between two manipulator parts, fitting the guiding device with sprung shanks pressed towards one another whereby the guiding device is compressed and introduced into the desired position in the link section following which the shanks spring back from one another when the pressure ceases and the guiding device snaps into the desired position in the link position.

* * * * *